May 22, 1934.   E. M. CLARK   1,960,203
PROCESS FOR THE IMPROVEMENT OF ILLUMINATING OILS
Filed Aug. 31, 1929
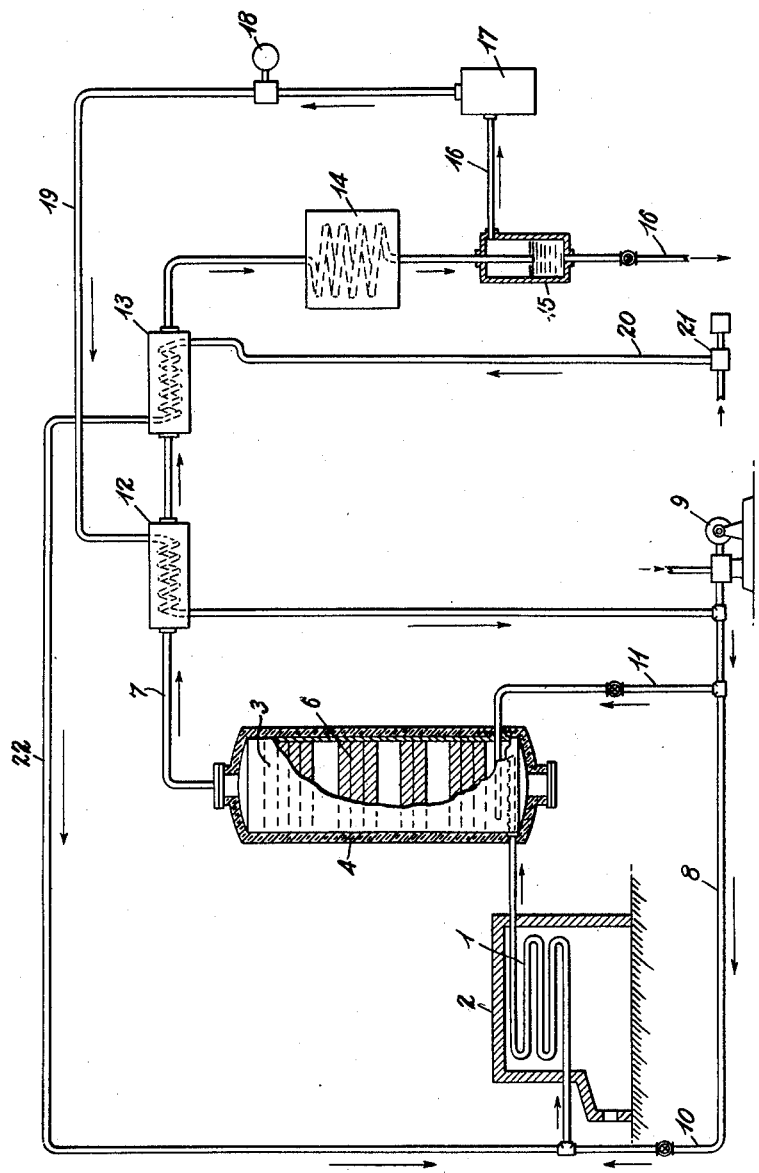
Edgar M. Clark   Inventor
By   W. E. Currie
   Attorney Patented May 22, 1934

1,960,203

UNITED STATES PATENT OFFICE 1,960,203

PROCESS FOR THE IMPROVEMENT OF ILLUMINATING OILS

Edgar M. Clark, Belle Haven, Greenwich, Conn., assignor to Standard-I. G. Company Application August 31, 1929, Serial No. 389,677

8 Claims. (Cl. 196—24)

The present invention relates to an improved process for producing burning oils from unrefined oil and more specifically to a process for producing high grade burning oils from inferior raw material heretofore regarded as unsuitable for production of highest grade burning oil. My invention will be fully understood from the following description and the drawing which illustrates one form of apparatus suitable for my process.

The drawing is a semi-diagrammatic view in sectional elevation of an apparatus constructed according to my invention.

Referring to the drawing reference numeral 1 denotes a heating coil arranged in a furnace setting 2 and adapted to heat a rapidly flowing stream of oil and gas to a high temperature. The coil discharges into a reaction chamber 3 which is constructed to withstand temperatures of 900° F. or higher and pressures of several hundred atmospheres as well as the corrosive effect of the reactants. The chamber or oven 3 is covered with an insulating layer 4 and may be heated in any suitable manner such as by electrical means (not shown) but generally the heat added in coil 1 is sufficient.

The reaction chamber is packed with a suitable catalytic material 6, to be disclosed below, arranged on trays or grids (not shown) or otherwise supported so that the incoming material passes over or through the catalytic layer before finding exit by line 7.

Hydrogen or a gas rich in free hydrogen is forced under high pressure through pipe 8 by compressor 9 and thence by branch lines 10 and 11 respectively into the inlet of coil 1 and/or directly into reactor 3. The outgoing mixture of oil and hydrogen passes by pipe 7 to heat exchangers 12 and 13 and thence to cooler 14 and separation drum 15. The oil is removed from the drum to storage (not shown) by line 16 while gas is separately drawn off to a purification system shown generally at 17. Purified hydrogen is recompressed by booster pump 18 and then flows to exchanger 12 and line 8 by line 19. Fresh oil is forced through line 20 by pump 21 to exchanger 13 and thence by line 22 to heating coil 1.

In the operation of my process a kerosene cut which is unsatisfactory for illuminating purposes due to the presence of a substantial proportion of non-paraffinic or unsaturated hydrocarbons such as olefinic but particularly aromatic hydrocarbons as indicated by sulphuric acid absorption, bromine numbers and the like is exposed to the action of the gas rich in free hydrogen at a temperature in excess of 750° F., while under pressure in considerable excess of atmospheric pressure, say in excess of about 20 atmospheres but preferably at about 200 atmospheres or higher. Other cuts from crude oil containing the kerosene fractions with or without higher boiling cuts such as gas oil may also be used as will be understood. The preferred temperature range is from 750 to about 870° F. It is generally most satisfactory to circulate about 8,000 to 16,000 cu. ft. of hydrogen per barrel of oil or higher although the actual consumption may be much less. The volume of hydrogen should in all cases be above about 5000 cu. ft. per barrel of oil. When the oil is particularly rich in non-paraffinic hydrocarbons, it is desirable to operate at the more elevated temperatures and it is also desirable to increase pressure and rate of gas recirculation.

The catalysts used are sulphur resistant; for example, oxides or sulphides of the sixth group of the periodic system of elements either alone or in mixtures with each other or other oxides of the alkali or alkaline earth groups. Other oxides such as rare earths, aluminum and the like may also be added and the catalyst is preferably packed in the drum in trays or in lumps as disclosed above.

The feed rate of the oil is preferably above about .1 volumes of oil per hour per volume of the drum and between the limits of .5 to 1.3 volumes of oil per hour, fed to drum per volume of reactor space, although the feed rate may be without these limits which are most satisfactory. The greater the time of contact, in general, the greater the improvement in the kerosene portion of the oil. Part of the oil is generally converted into hydrocarbon gas and distillate of a lower boiling point than the original feed so that it is generally the practice to steam distill to the proper flash point, say 115° to 150° F. It is also desirable to wash the purified oil with alkali immediately after hydrogen treatment but sulphuric acid treatment is unnecessary. Yield of 80 to 90% of the oil naturally boiling within the kerosene range is recovered as a high grade illuminating oil, the remainder being a light oil and gas of paraffinic nature. Sulphur is reduced and the candle power of the oil is increased, in addition to improvements in general burning qualities, color, color stability and the like. In case the oil is not water white after the hydrogen treatment, it may be necessary to distill with or without steam to a 2 to 10% bottoms, after an alkali wash. The distillate from this rerun operation will be satisfactory if the hydrogen treatment has been properly carried out.

As an example of the operation of my process a naphtha bottoms of the following characteristic and totally unfit for burning oil is treated:

| | |
|---|---|
| Gravity | 39.7° A. P. I. |
| Initial boiling point | 357° F. |
| Final boiling point | 508° F. |
| Sulphur | .334% |
| Viscosity | 400 Saybolt Thermo. |
| Flash | 139° F. |

This oil is treated with hydrogen under pressure of 3000 pounds per square inch at 820° F. The feed rate equal to about .63 volumes of oil per hour volume of the catalytic chamber. The catalyst is a mixture of tungsten, zinc and magnesium oxides and is placed in the drum in lump form. The gas rate is about 8,500 cu. ft. per barrel of oil fed. The product recovered was 102.5% by volume of the oil fed. The gas loss is under 2% by weight of oil fed.

The total overhead product gives the following inspection:

| | |
|---|---|
| Percent sulphur | .028% |
| Initial boiling point | 170° F. |
| Final boiling point | 544° F. |

This is then washed with alkali and run for the maximum yield of 335 viscosity refined oil, which had the following characteristics. The yield was about 80%:

| | |
|---|---|
| Gravity | 44.4 |
| Viscosity | 355 Saybolt Thermo. |
| Sulphur | .021 |
| Flash | 125° F. Abel. |

This oil is an excellent burning oil which did not crust the wick and showed little tendency to smoke. The candle power is high and it is satisfactory in all respects.

The remaining oil is a naphtha having a gravity of 52.4° A. P. I. and sulphur content of .012 being about 20% by volume of the oil fed, it is substantially saturated.

While I intend my process to be used in the treatment of oils of the boiling range of kerosene, it is desirable to include some heavier fractions as well which may be converted during the treatment into suitable burning oil fractions boiling within the kerosene range.

My invention is not to be limited by any theory of the mechanism of the process nor to any specific example of the operation given merely for purposes of illustration but only by the following claims in which I wish to claim all novelty inherent in my process.

I claim:

1. An improved process for producing high grade kerosene from distillate oils containing fractions of the boiling range of commercial kerosene and above, but unsuitable for illuminating purposes, which comprises subjecting such oil to destructive hydrogenation with a gas rich in free hydrogen under pressure in excess of 20 atmospheres at temperature between the approximate limits of 750 and 870° F. for a time sufficient to produce an appreciable quantity of oils boiling below kerosene but less than 20% of the original fractions of that boiling range, whereby non-paraffinic constituents of the oil are substantially eliminated.

2. Process according to claim 1 in which the volume of hydrogen is in excess of 5,000 cubic feet per barrel of oil treated.

3. Process according to claim 1 in which the oil recovered is washed with an alkaline agent and re-distilled.

4. Process according to claim 1 in which the oils are treated as described in the presence of a sulphur insensitive catalyst.

5. The process for improving the burning quality of a hydrocarbon oil boiling in the burning oil range by saturation and reduction of the non-paraffinic constituents by destructive hydrogenation which comprises passing such an oil, together with a gas rich in free hydrogen, through a reaction zone maintained at a moderate to low destructive hydrogenation temperature and under pressure in excess of 20 atmospheres at a rate of less than about 1.3 volumes of oil per volume of reaction space per hour whereby an appreciable quantity of oil boiling below kerosene is formed but sufficiently rapid to prevent formation of more than about 20% of light oil boiling below the kerosene range.

6. The process of improving the burning quality of a hydrocarbon oil boiling in the burning oil range by saturation and reduction of the non-paraffinic constituents by destructive hydrogenation which comprises passing such an oil, together with a gas rich in free hydrogen through a reaction zone maintained at a moderate to low destructive hydrogenation temperature and under pressure in excess of 20 atmospheres at a rate between .1 and 1.3 volumes of oil per volume of reaction space per hour whereby an appreciable quantity of oil boiling below kerosene is produced but the amount of such low boiling oil is limited to less than 20% of the feed.

7. An improved process for improving the burning quality of kerosene by destructive hydrogenation which comprises passing the oil with a gas rich in free hydrogen through a suitable catalytic zone maintained at a temperature between about 750 and 870° F. while under pressure in excess of 20 atmospheres for a period of time sufficient for production of an appreciable amount of lower boiling oil by destructive hydrogenation, but insufficient to allow formation of more than about 20% of such light oil boiling below the kerosene range whereby non-paraffinic constituents are substantially eliminated, and cooling the materials out of contact with air.

8. A process of improving the burning quality of kerosene by elimination of non-paraffinic constituents therefrom by destructive hydrogenation which comprises passing such an oil together with a gas rich in free hydrogen through a reaction zone maintained at a moderate to low destructive hydrogenation temperature and under pressure in excess of 20 atmospheres at a rate in excess of .1 volume of oil per volume of reaction space per hour, whereby an appreciable quantity of oil boiling below kerosene is produced but such quantity is limited to less than 20% of the product.

EDGAR M. CLARK.